United States Patent
Neiger et al.

(10) Patent No.: US 7,506,121 B2
(45) Date of Patent: Mar. 17, 2009

(54) METHOD AND APPARATUS FOR A GUEST TO ACCESS A MEMORY MAPPED DEVICE

(75) Inventors: Gilbert Neiger, Portland, OR (US); Andrew V. Anderson, Hillsboro, OR (US); Steven M. Bennett, Hillsboro, OR (US); Rajesh Sankaran Madukkarumukumana, Portland, OR (US); Richard A. Uhlig, Hillsboro, OR (US); Rajesh S. Parthasarathy, Hillsboro, OR (US); Sebastian Schoenberg, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 11/322,757

(22) Filed: Dec. 30, 2005

(65) Prior Publication Data

US 2007/0156986 A1    Jul. 5, 2007

(51) Int. Cl.
    G06F 12/00    (2006.01)

(52) U.S. Cl. .................................................. 711/163
(58) Field of Classification Search .................. None
    See application file for complete search history.

(56) References Cited

U.S. PATENT DOCUMENTS 7,127,548 B2 * 10/2006 Bennett et al. .................. 711/6
7,277,999 B1 * 10/2007 Agesen et al. ............. 711/163

* cited by examiner

Primary Examiner—Hiep T Nguyen
(74) Attorney, Agent, or Firm—Thomas R. Lane

(57) ABSTRACT

Embodiments of apparatuses, methods, and systems for guests to access memory mapped devices are disclosed. In one embodiment, an apparatus includes evaluation logic and exit logic. The evaluation logic is to determine, in response to an attempt of a guest to access a device using a memory address mapped to the device and based on an access type, whether the access is allowed. The exit logic is to transfer control to a host if the evaluation logic determines that the access is not allowed.

11 Claims, 3 Drawing Sheets

METHOD 300

METHOD AND APPARATUS FOR A GUEST TO ACCESS A MEMORY MAPPED DEVICE

BACKGROUND

1. Field

The present disclosure pertains to the field of information processing, and more particularly, to the field of virtualizing resources in information processing systems.

2. Description of Related Art

Generally, the concept of virtualization of resources in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of, and may or may not be aware of, the virtualization environment.

A processor in an information processing system may support virtualization, for example, by supporting an instruction to enter a virtualization environment to run a guest on a VM. In the virtualization environment, certain events, operations, and situations, such as external interrupts or attempts to access privileged registers or resources, may be "intercepted," i.e., cause the processor to exit the virtualization environment so that a VMM may operate, for example, to implement virtualization policies. A processor may also support other instructions for maintaining a virtualization environment, and may include register bits that indicate or control virtualization capabilities of the processor.

The system's privileged resources may include input/output ("I/O") devices that may be accessed through I/O transactions and/or through memory transactions where the I/O device has been mapped to a memory address (a "memory mapped device"). I/O transactions may be intercepted to prevent a guest from directly accessing an I/O device. Memory transactions to memory-mapped I/O devices may be intercepted in a page-based memory management architecture by marking pages to which an I/O device has been mapped as not present or not writable, thereby causing a page fault intercept if a guest attempts to access the memory mapped device.

BRIEF DESCRIPTION OF THE FIGURES

The present invention is illustrated by way of example and not limitation in the accompanying figures.

DETAILED DESCRIPTION

Embodiments of apparatuses, methods, and systems for a guest to access a memory mapped device are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

The performance of a virtualization environment may be improved if the frequency of intercepted events is minimized. Embodiments of the invention may be used to support the virtualization of memory mapped devices and may be desirable to provide improved performance in a virtualization environment. In one embodiment, they may be used to support the virtualization of the task priority register ("TPR") of an Advanced Programmable Interrupt Controller ("APIC") in a processor in the Pentium® Processor Family. In this embodiment, performance may be improved over a virtualization environment in which all guest accesses to the TPR are intercepted by a VMM, by eliminating the need for a VMM intercept on some guest accesses to the TPR.

Figure 1:
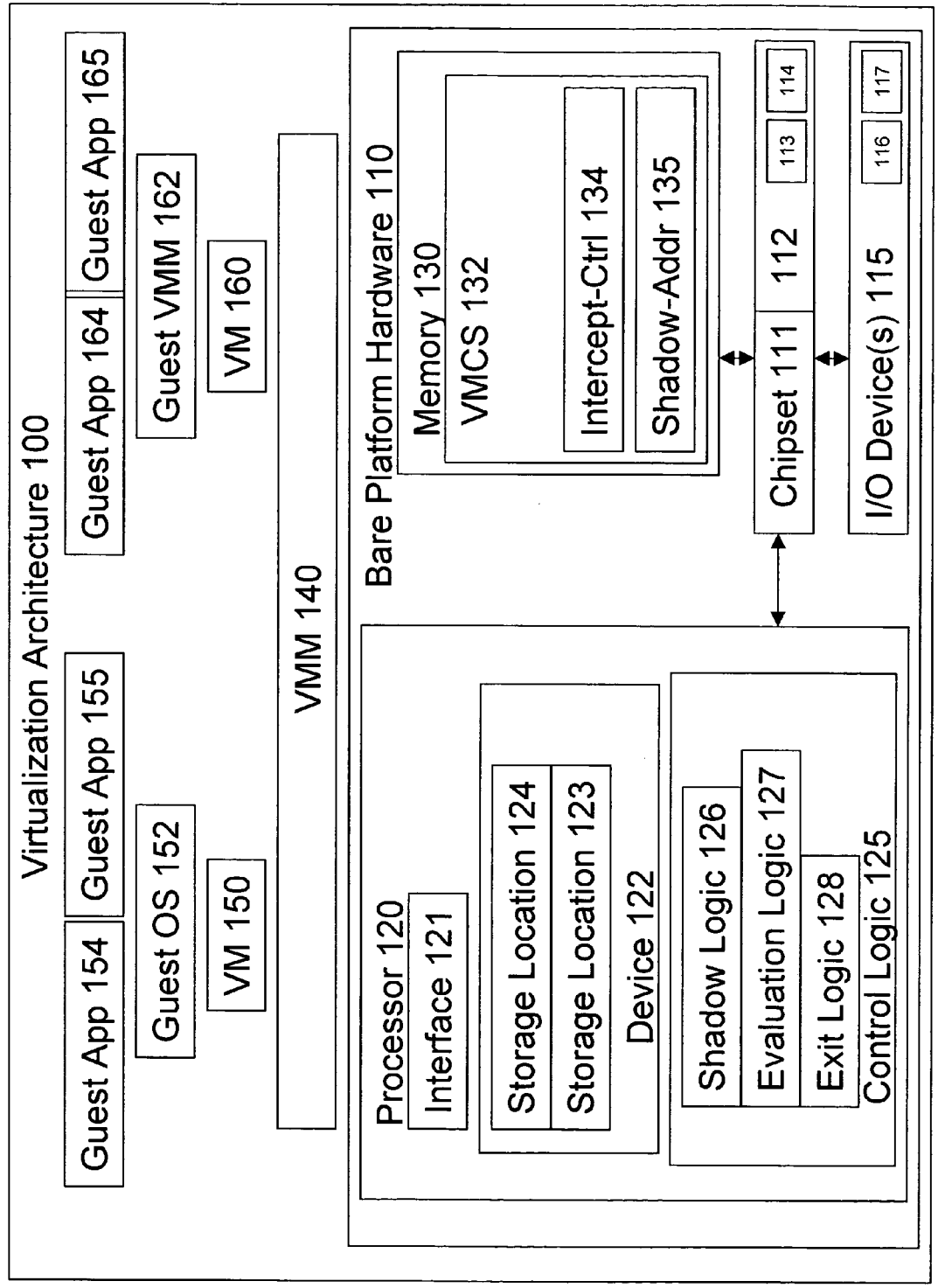
FIG. 1 illustrates a virtualization environment, in which an embodiment of the present invention may operate.

FIG. 1 illustrates virtualization architecture 100, in which an embodiment of the present invention may operate. In FIG. 1, bare platform hardware 110 may be any data processing apparatus capable of executing any OS or VMM software. For example, bare platform hardware may be that of a personal computer, mainframe computer, portable computer, handheld device, set-top box, server, or any other computing system. Bare platform hardware 110 includes processor 120, memory 130, input/output ("I/O") device 111, and chipset 112.

Processor 120 may be any type of processor, including a general purpose microprocessor, such as a processor in the Pentium® Processor Family, the Itanium® Processor Family, or other processor family from Intel Corporation, or another processor from another company, or a digital signal processor or microcontroller. Although FIG. 1 shows only one such processor 120, bare platform hardware 110 may include any number of processors, including any number of multicore processors, each with any number of execution cores and any number of multithreaded processors, each with any number of threads.

Memory 130 may be static or dynamic random access memory, semiconductor-based read only or flash memory, magnetic or optical disk memory, any other type of medium readable by processor 120, or any combination of such mediums. Memory 130 may be addressable according to any addressing techniques, and any device shown or not shown in bare platform hardware 110 may be mapped to an address within the address range of memory 130.

I/O device(s) 115 may represent any number of peripheral or I/O devices, such as a monitor, a keyboard, a mouse, a printer, a network interface, an information storage device, etc. Chipset 111 may be include any number of components that perform any number of tasks, such as system logic, bus control, bus interfacing, bus bridging, memory control, peripheral device control, peripheral device functions, system configuration, etc. In some embodiments, I/O device(s) 115 may be accessed through one or more I/O ports (if the processor and platform architectures support such access mechanisms). In some embodiments, I/O device(s) 115 may be accessed through one or more address ranges using normal memory access instructions, i.e., through a memory-mapped interface. A memory-mapped I/O device has at least one such address range through which it may be accessed.

Processor 120, memory 130, I/O device(s) 115, and chipset 111 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150 and 160, and guest OSs and applications 152, 154, 155, 162, 164, and 165.

VMM 140 may be any software, firmware, or hardware host installed on or accessible to bare platform hardware 110, to present VMs, i.e., abstractions of bare platform hardware 110, to guests, or to otherwise create VMs, manage VMs, and implement virtualization policies within virtualization environment 100. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

Each guest expects to access physical resources, such as processor and platform registers, memory, and input/output devices, of bare platform hardware 110, according to the architecture of the processor and the platform presented in the VM. FIG. 1 shows two VMs, 150 and 160, with guest OS 152 and guest applications 154 and 155 installed on VM 150 and guest OS 162 and guest applications 164 and 165 installed on VM 160. Although FIG. 1 shows only two VMs and two applications per VM, any number of VMs may be created, and any number of applications may run on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be running on, or in control of, processor 120. When a privileged event occurs or a guest attempts to access a privileged resource, control may be transferred from the guest to VMM 140. The transfer of control from a guest to VMM 140 is referred to as a "VM exit" herein. After handling the event or facilitating the access to the resource appropriately, VMM 140 may return control to a guest. The transfer of control from VMM 140 to a guest is referred to as a "VM entry" herein.

In the embodiment of FIG. 1, processor 120 controls the operation of VMs 150 and 160 according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, any other such information. Processor 120 reads information from VMCS 132 to determine the execution environment of a VM and constrain its behavior. In this embodiment, VMCS 132 is stored in memory 130. In some embodiments, multiple VMCSs are used to support multiple VMs. Although FIG. 1 shows VMCS 132 stored in memory 130, storing a VMCS in a memory is not required by the present invention.

Processor 120 may include memory mapped device 122 having registers or other control, configuration, status, or information storage structures or locations 123 and 124. For example, memory mapped device 122 may be an APIC, storage location 123 may be a TPR, and storage location 124 may be any other APIC register or portion of a register. Chipset 111 may also include memory mapped device 112 with storage locations 113 and 114, and I/O device 115 may also be a memory mapped device including storage locations 116 and 117. Processor 120 and/or chipset 111 may have include any additional memory mapped devices, any other I/O device may be a memory mapped device, and/or any other processor, chipset, or component not shown in FIG. 1 may be a memory mapped device to be accessed by a guest according to an embodiment of the present invention. Storage locations 123, 124, 116 and 117 may be accessed through I/O instructions and/or memory accesses, as described above. Hence, the following descriptions, when referencing accesses to a storage location, should be interpreted to mean accesses to a memory range or I/O ports corresponding to the storage location. Such storages may backed by memory in the I/O device, or may provide an interface to functionality provided by the I/O device.

Processor 120 also includes interface 121 to memory 130, which may be a bus unit or any other unit, port, or interface to allow processor 120 to communicate with memory 130 through any type of bus, point to point, or other connection, directly or through any other component, such as chipset 111.

Additionally, processor 120 includes control logic 125 to support virtualization, including the virtualization of access to memory mapped devices such as devices 122, 112, and 115. Control logic 125 may be microcode, programmable logic, hard-coded logic, or any other form of control logic within processor 120. In other embodiments, control logic 125 may be implemented in any form of hardware, software, or firmware, such as a processor abstraction layer, within a processor or within any component accessible or medium readable by a processor, such as memory 130.

Control logic 125 causes processor 120 to execute method embodiments of the present invention, such as the method embodiments illustrated in below in FIGS. 2 and 3, for example, by causing processor 120 to include the execution of one or more micro-operations, e.g., to support virtualization, in its response to virtualization instructions or other instructions from a host or guest.

Control logic 125 includes shadow logic 126, evaluation logic 127, and exit logic 128. Shadow logic 126 is to support shadowing of a memory mapped device, as described below. Evaluation logic 127 is to determine whether an attempt of a guest to access a memory region (e.g., storage of a memory mapped device) is allowed. Exit logic 128 is to prepare for and cause a VM exit if the attempt is not allowed. Each of these logic units may also perform additional functions, including those described as being performed by another of the logic units, and any or all of these logic units may be integrated into a single logic unit.

VMCS 132 may include fields, control bits, or other data structures to support the virtualization of memory mapped devices such as devices 122, 112, and 115. These data structures may be checked or otherwise referred to by control logic 125 to determine how to manage a VM environment. For example, intercept-control bit 134 may be set to cause certain attempts by a guest to access a shadowed, or virtual copy of a storage location in a memory mapped device to result in a VM exit, as described below. In the description of this embodiment, these control bits are set to enable or cause a desired effect, where set means writing a logical one to the bit, but any logic convention or nomenclature may be used within the scope of the present invention.

Also in VMCS 132, shadow-address field 135 may be used to store an address of a memory location at which a shadow, or virtual copy of a storage location in a memory mapped device may be stored. For example, where storage location 123 is a TPR, shadow-address field 135 may be a 64-bit field determining the location in memory of a 4-kilobyte virtual APIC page, such that a virtual copy of the task priority may be stored in bits 7:4 of the TPR field, at offset 80H of the virtual APIC page. In an alternative embodiment, VMCS 132 may include a field to directly store a shadow copy of a value desired to be stored in storage location 123, rather than a pointer to a memory location for the value. For example, VMCS 132 may include a four-bit field to directly store a virtual copy of a value desired to be stored in a TPR.

Figure 2:
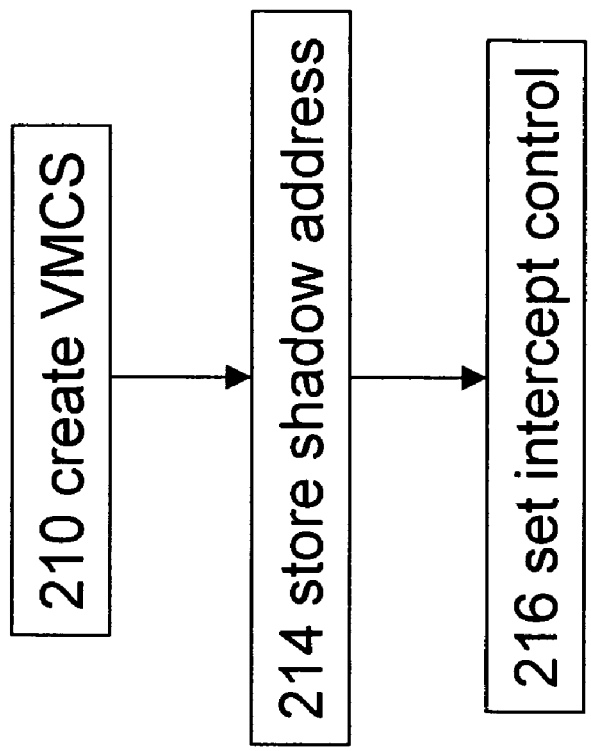
FIG. 2 illustrates an embodiment of the present invention in a method for a VMM to initialize support for a guest to access a memory mapped device.
Figure 3:
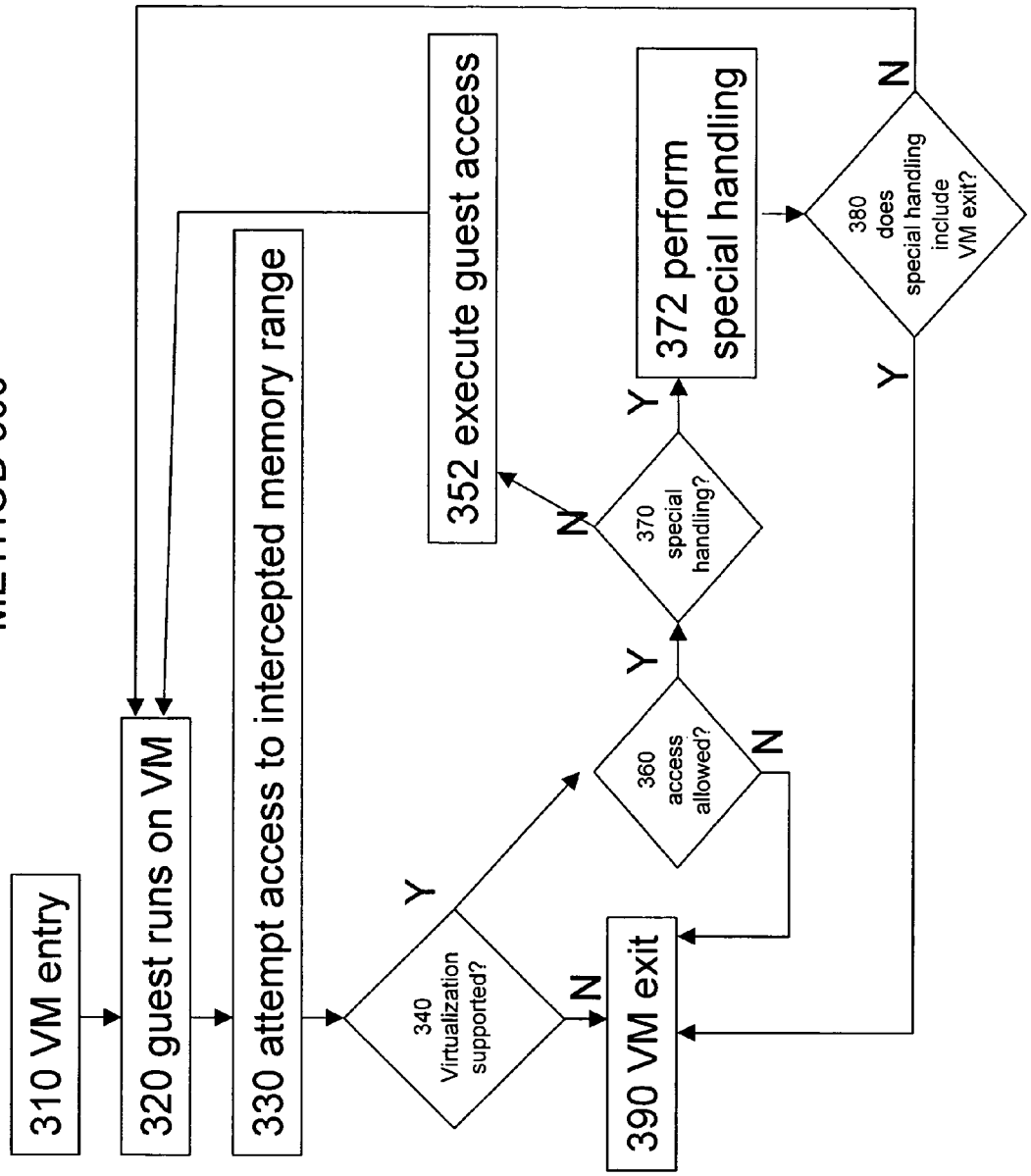
FIG. 3 illustrates an embodiment of the present invention in a method for a guest to access a memory mapped device.

FIGS. 2 and 3 illustrate method embodiments of the present invention. Although method embodiments are not limited in this respect, reference is made to virtualization environment 100 of FIG. 1 to describe the method embodiments of FIGS. 2 and 3. This description uses the terms "access to the memory mapped device," "access to storage," and the like, where such terms mean that these accesses occur through normal memory access instructions.

FIG. 2 illustrates an embodiment of the present invention in a method for a VMM to initialize support for a guest to access a memory mapped device.

In box 210 of FIG. 2, VMM 140 of FIG. 1 creates a VMCS (e.g., VMCS 132) for a VM. In boxes 212 to 216, VMM 140 configures VMCS 132 to implement virtualization of a memory mapped device, such as memory mapped device 122.

In box 214, an address of a memory location for storing the shadow copy of storage location 123 is written to address field 135. As described above, the address may be a base address to which an offset may be added to determine the address of the memory location to be used as a shadow location, or the address may be the address of the shadow location. Alternatively, the shadowed value may be stored directly in a VMCS, rather than a pointer to the shadowed value. In one embodiment, VMM 140 may allocate memory to store the shadow value.

In box 216, intercept-control bit 134 is set to cause certain attempts by a guest to access the shadowed, or virtual copy of storage location 123 in memory mapped device 122 to result in a VM exit, as described with reference to FIG. 3. Note that in this embodiment as will be further described with reference to FIG. 3, memory mapped device 122 may also include storage location 124 that is not shadowed.

FIG. 3 illustrates an embodiment of the present invention in a method for a guest to access a memory mapped device.

In box 310 of FIG. 3, a VM entry is performed and control is transferred to a guest. In box 320, the guest begins or continues to run on the VM. In box 330, the guest attempts a memory access to an address in a range of memory addresses assigned to memory mapped device 122. The memory access may be a read, a write, an execute attempt, or a read-modify-write attempt. The memory access may include special qualifiers, such as bus locking indications. The memory access may be explicit (e.g., a data access, a stack read, or instruction fetch) or may be implicit (e.g., a fetch of page table data following a TLB miss, a write of accessed or dirty bits to the page tables, or a read of a segment descriptor). Evaluation logic 127 may detect the attempted access using address comparators or through any other approach known in the art. In one embodiment, the detection of the memory access may be performed by analysis of physical addresses. In another embodiment, linear or virtual addresses are used.

A memory mapped device may be considered to be fully shadowed if a guest has access to shadow or virtual copies of all storage location available in the device (e.g., if memory mapped device included only storage locations 123 and 124 and both are being shadowed). A memory mapped device may be considered to be partially shadowed if a guest has access to a shadow or virtual copy of at least one of the storage locations available in the device (e.g., if storage location 123 is being shadowed but not storage location 124). In some embodiments, more than one control bit may be checked, or different control bits may be checked depending on which storage location of a memory mapped device a guest is attempting to access.

If the intercept mechanism for memory mapped device 122 is not enabled, in box 340, then, in box 390, exit logic 128 causes a VM exit to occur to allow the VMM to handle the access. However, if the intercept mechanism for memory mapped device 122 is enabled in box 340, then method 300 proceeds to box 360. In box 360, evaluation logic 127 determines whether the access should be allowed. If the access is not allowed, then, in box 390, exit logic 128 causes a VM exit to occur to allow the VMM to handle the access.

However, if intercept-control bit 134 is enabled in box 350, then method 300 proceeds to box 360. In box 360, evaluation logic 127 determines whether the access should be allowed. If the access is not allowed, then, in box 390, exit logic 128 causes a VM exit to occur to allow the VMM to handle the access.

The determination of whether the access should be allowed may be based on the type of access attempted. In one embodiment, read accesses may be allowed but write accesses may not be allowed. In one embodiment, execute attempts may not be allowed. In one embodiment, read-modify-write attempts may not be allowed. In some embodiments, implicit accesses may not be allowed. Other restrictions based on the access type are also possible. In another embodiment, whether the access is allowed may depend on whether the access is to a shadowed location or to an unshadowed or a partially shadowed location. Therefore, the access type may be shadowed, unshadowed, or partially shadowed. For example, if the access is to a shadowed location, such as location 123 in device 122, the access may be allowed, but if the access is to an unshadowed location, such as device 124 in device 122, or a partially shadowed location, such as a location including both shadowed location 123 and unshadowed location 124, the access may not be allowed. Other access types may be possible within the scope of the present invention.

An embodiment where memory mapped device 122 is an APIC is described as an additional example. The attempted access may be an instruction attempting to access the TPR (the access would actually be to a virtual copy of the TPR ("V-TPR") since the TPR is being shadowed). Such an instruction may cause one or more accesses to the virtual APIC ("V-APIC") page. If the instruction includes a read from the V-TPR and no other accesses to the V-APIC, then the read may be allowed. If the instruction includes a write to the V-TPR with no other accesses to the V-APIC page, then the write may be allowed, and shadow logic 126 ensures that bits 127:8 of the V-TPR field are cleared after the write (i.e., the shadow logic would perform special handling as described below). The preceding two instructions in an embodiment using a V-APIC may be considered to be shadowed accesses, where the type of access may be shadowed, unshadowed, or partially shadowed, because the TPR is shadowed. In one embodiment, shadow logic 126 may perform appropriate updates to portions of the shadowed storage or to other storage locations or machine registers. For example, in one embodiment writes to portions of shadowed storage locations may be ignored. In another embodiment, reads of shadowed storage locations which are read-only may always return the corresponding reserved values, e.g., zeros, regardless of the values stored in the shadow memory.

Another instruction in an embodiment using a V-APIC may be considered to be partially shadowed. If an instruction includes an access to the V-TPR and an access to another location in the V-APIC (that is not shadowed), a VM exit is performed.

If, in box 360, evaluation logic 127 determines that the access should be allowed, then, in box 370, evaluation logic 127 determines if special handling is required. Special handling may include any handling of the attempted access that may be performed by control logic 125. One example was given above for an instruction including a write to a V-TPR. Another example, also in an embodiment using a V-APIC, is if an instruction includes more than one access to a V-TPR. In this case, the special handling may be to allow the instruction to execute, but then cause a VM exit to occur.

If, in box 370, evaluation logic 127 determines that no special handling is required, then, in box 352, shadow logic 126 causes the guest access to be performed using the virtual version of memory mapped device 122, and method 300 returns to box 320 for the guest to continue to run. If, however, in box 370, evaluation logic 127 determines that special handling is required, then, in box 372, control logic 125 performs the special handling. This special handling may include performing the guest access using the virtual version of memory mapped device 122 in whole or in part, as discussed below.

In box 380, control logic 125 determines if the special handling includes a VM exit. If so, then in box 390, exit logic 128 causes a VM exit to occur. If not, then method 300 returns to box 320 for the guest to continue to run.

In one embodiment, special handling may be provided to support virtualization of the TPR in an APIC. In this embodiment, writes to the TPR may always be allowed to write to the shadow. If the value written is less than a VMM specified threshold value (e.g., stored in a field in the VMCS), then a VM exit occurs. As described above, accesses that are partially shadowed, such as writes that modify addresses other than the TPR field of the V-APIC cause VM exits. In another embodiment, writes are allowed to complete to the virtual version of memory mapped device 122, and at the completion of the instruction, a VM exit occurs.

Within the scope of the present invention, the methods illustrated in FIGS. 2 and 3 may be performed in a different order, with illustrated boxes omitted, with additional boxes added, or with a combination of reordered, omitted, or additional boxes. For example, a VMCS may include load-control and store-control bits that may be used in connection with shadow-control and/or intercept-control bits to determine whether read and/or write accesses are allowed.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses and methods for a guest to access a memory mapped device have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
evaluation logic to determine, in response to an attempt of a guest to access a device using a memory address mapped to the device and based on an access type, whether the access is allowed;
exit logic to transfer control of the apparatus from the guest to a host if the evaluation logic determines that the access is not allowed; and
configuration logic to cause, based on a configuration indicator, the exit logic to transfer control of the apparatus from the guest to the host regardless of the determination of the evaluation logic.

2. The apparatus of claim 1, wherein the access type includes at least one of a read access, a write access, an execute access, a read-modify-write access, an implicit access, and an explicit access, and the evaluation logic is to determine that the access is allowed if the access is of a predetermined type.

3. The apparatus of claim 2, wherein the predetermined type is the read access type.

4. The apparatus of claim 1. wherein the attempt is an attempt to write data to the device, further comprising shadow logic to cause the data to be written to a shadow location.

5. The apparatus of claim 4, wherein the shadow logic is to cause the data to be written to a shadow location before transfer of control of the apparatus from the guest to the host.

6. The apparatus of claim 1, wherein the access type includes at least one of a shadowed access, a partially shadowed access, and an unshadowed access, and the evaluation logic is to determine that the access is allowed if the access is of the shadowed access type.

7. The apparatus of claim 6, wherein the device includes an interrupt controller, and the shadowed access type includes access to only a location to indicate a task priority and the partially shadowed access type includes access to the location to indicate the task priority and a location other than the location to indicate the task priority.

8. The apparatus of claim 2, wherein the device includes an interrupt controller, the predetermined type is the write access typo, the access is to a location to indicate a task priority, the access is allowed to a shadow location, and the exit logic is also to transfer control of the apparatus from the guest to the host after the access is allowed.

9. A method comprising:
   detecting an attempt by a guest to access a task priority location of an interrupt controller using a memory address mapped to the device interrupt controller;
   determining, based on an access type, that the access is a write access;
   allowing the access to a shadow location; and
   transferring control from the guest to the host if the access is allowed.

10. A system comprising:
    a processor including:
      evaluation logic to determine, in response to an attempt of a guest to access a device using a memory address mapped to the device and based on an access type, whether the access is allowed; and
      exit logic to transfer control of the processor from the guest to a host if the evaluation logic determines that the access is not allowed; and
    a memory to store a control structure for a virtual machine for a guest, the control structure including an indicator to indicate that the exit logic is to transfer control of the processor from the guest to the host regardless of the determination of the evaluation logic.

11. The system of claim 10, wherein the attempt is an attempt to write data to the device and the processor further comprises shadow logic to cause the data to be written to a shadow location in the memory.

\* \* \* \* \*